United States Patent
Iwamura (10) Patent No.: US 6,498,628 B2
(45) Date of Patent: *Dec. 24, 2002

(54) MOTION SENSING INTERFACE

(75) Inventor: Ryuichi Iwamura, San Diego, CA (US)

(73) Assignees: Sony Corporation, Tokyo (JP); Sony Electronics Inc., Park Ridge, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/193,594

(22) Filed: Nov. 17, 1998

(65) Prior Publication Data

US 2002/0057383 A1 May 16, 2002

Related U.S. Application Data

(63) Continuation-in-part of application No. 09/170,871, filed on Oct. 13, 1998.

(51) Int. Cl.[7] .................................................. H04N 5/44
(52) U.S. Cl. .................. 348/734; 348/155; 348/169; 345/157; 345/158
(58) Field of Search .......................... 348/734, 169, 348/700, 155; 345/156, 157, 158, 145; H04N 5/44, 7/18, 5/225

(56) References Cited

U.S. PATENT DOCUMENTS

| | | | |
|---|---|---|---|
| 4,988,981 A | * 1/1991 | Zimmerman et al. | 345/158 |
| 5,444,791 A | * 8/1995 | Kamada et al. | 348/155 |
| 5,473,364 A | * 12/1995 | Burt | 348/155 |
| 5,594,469 A | * 1/1997 | Freeman et al. | 345/158 |
| 5,617,312 A | * 4/1997 | Iura et al. | 345/157 |
| 5,808,678 A | * 9/1998 | Sakaegi | 348/334 |
| 5,991,428 A | * 11/1999 | Taniguchi | 348/155 |
| 6,191,773 B1 | * 2/2001 | Maruno et al. | 345/158 |

* cited by examiner

*Primary Examiner*—John Miller
*Assistant Examiner*—Trang U. Tran
(74) *Attorney, Agent, or Firm*—Fitch, Even, Tabin & Flannery (57) ABSTRACT

An electronic appliance remote controller which includes a display screen (which may be part of the appliance, e.g. a TV screen) for displaying icons representing possible operations of the electronic appliance, and a motion detector circuit for detecting a motion within a field of view of the motion detector circuit. The motion detector circuit either detects an image of the user's hand or a predetermined motion of a moving hand within the field of view as an indication that a remote control operation is to be started and, thereafter, tracks the movement of the hand. The motion detector circuit outputs a cursor control signal representative of the motion of the hand. A control circuit, connected to the display screen, the electronic appliance, and the motion detector circuit and supplied with the cursor control signal, controls the display screen to display a movable visual indicator, e.g. a cursor, whose own motion tracks the movement of the moving hand and the electronic appliance to perform operations corresponding to the icons selected by the user using the visual indicator. In one embodiment, two cameras allow three dimensional movements of the user's hand to control the electronic appliance.

44 Claims, 12 Drawing Sheets

MOTION SENSING INTERFACE

CROSS-REFERENCE TO RELATED APPLICATION

This application is a continuation-in-part application of co-pending U.S. application Ser. No. 09/170,871, entitled Motion Sensing Interface for a Television Set, by Ryuichi Iwamura, filed Oct. 13, 1998.

BACKGROUND OF THE INVENTION

1. Field of the Invention

This invention relates to a remote control commander for an electronic appliance, such as a television set, and more particularly to an optical motion sensing remote control system for an electronic appliance.

2. Related Art

An IR (Ifra Red) remote commander is a common means to control a TV from a distance. However, existing remote commanders have some drawbacks. They are easy to lose. The user often mistakes a VCR commander for the TV commander. In fact, a lot of people have a great "remote commander collection". Also one has to learn which button is where on the commander. Remote commanders require batteries which have to be replaced periodically. If a TV could have a camera vision and read the user's gestures, no remote commander would be necessary. However, it is not easy for a TV to distinguish gestures from other moves in its camera view. One would not want the channel to change each time the user got up to fetch a snack from the kitchen, for example.

SUMMARY OF THE INVENTION

The above and other problems of prior art electronic appliance remote controllers are overcome by an electronic appliance remote controller according to the present invention which includes a display screen (which may be part of the appliance, e.g. a TV screen) for displaying icons representing possible operations of the electronic appliance, and a motion detector circuit for detecting a motion within a field of view of the motion detector circuit. The motion detector circuit detects either the image of the user's hand or a predetermined motion of the user's moving hand within the field of view as an indication that a remote control operation is to be started and, thereafter, tracks the movement of the hand. The motion detector circuit outputs a cursor control signal representative of the motion of the hand. A control circuit, connected to the display screen, the electronic appliance, and the motion detector circuit and supplied with the cursor control signal, controls the display screen to display a movable visual indicator, e.g. a cursor, whose own motion tracks the movement of the moving hand. The control circuit also controls the electronic appliance to perform operations corresponding to the icons selected by the user using the visual indicator.

In a preferred embodiment, the motion detector circuit detects the selection of an icon by the user by detecting a predetermined motion pattern of the hand when the visual indicator is coincident on the display screen with a particular icon. For example, the motion detector circuit detects the selection of an icon by the user by detecting a cessation of movement of the hand for a predetermined period of time after the visual indicator is coincident on the display screen with a particular icon. Alternatively, the motion detector may detect a hand movement akin to pushing in the icon as one would push in a button.

In the preferred embodiment, the motion detector circuit includes at least one video camera, random access memory interface, a random access memory, and a CPU and detects motion by comparing corresponding pixel values in each macro block of two successive video frames output by the camera. If the absolute value of the differences for two corresponding macro blocks from the two successive frames exceeds a predetermined minimum value, it is judged that motion has taken place in that macro block and it is an active region.

In one embodiment, for each video frame, the motion detector circuit, in determining whether to track a hand, checks to determine if a detected active region satisfies the conditions (a) that the active region made one linear movement in a first direction and (b) the active region returned to the start position where it used to be. The motion detector locks onto that region if conditions (a) and (b) are both satisfied. Naturally, any sort of repetitive movement could be used to cue the motion detector to lock onto the hand motion.

In another embodiment, the motion detector compares a user selected portion of the video image output by the camera with a stored video image and determines that the user selected portion of the video image output by the camera is the user's hand if there is a match with the stored video image. Various means are provided for allowing the user to select the portion of the video image as his or her hand.

In order that the same general length of hand movement will control the visual indicator to move a consistent corresponding length of movement, the control circuit includes an automatic cursor sensitivity adjustment feature which automatically scales the extremes of the movement of the visual indicator to the extremes of the predetermined hand motion so that, for example, the same diagonal motion of the user's hand will cause the visual indicator to move just across the diagonal of the display screen regardless of whether the user is close to the motion detector circuit or far away.

A remote control method for an electronic appliance according to the invention begins with the step of detecting the user's hand either by (a) recognizing a portion of an image in a video camera's output as the user's hand or (b) recognizing a first predetermined hand motion within a field of view. Recognition of the user's hand is an indication that a remote control operation is to be started. The next step is visually displaying on a display screen, such as a TV screen, icons representing possible operations of the electronic appliance (e.g. a TV). Thereafter, remote control is carried out by tracking the movement of the hand and outputting a cursor control signal representative of the motion of the hand. Responsive to the control signal, the display screen is controlled to display a movable visual indicator, e.g. a cursor, whose movement tracks the movement of the moving hand. The electronic appliance is then controlled to perform operations corresponding to the icons selected by the user using the visual indicator. The first predetermined motion can be any hand movement, such as a back and forth hand movement, for example.

The step of detecting the selection of an icon by the user includes detecting a second predetermined motion pattern of the hand when the visual indicator is coincident on the display screen with a particular icon. For example, the predetermined motion pattern could be a cessation of movement of the hand for a predetermined period of time after the visual indicator is coincident on the display screen with the particular icon or, by the use of two orthogonally placed cameras, detecting movement of the user's hand which emulates pushing in an icon as one would push in a button.

The motion detecting step uses at least one video camera in the preferred embodiment and includes comparing corresponding pixel values in each macro block of two successive frames. If the absolute value of the differences for two corresponding macro blocks from the two successive frames exceeds a predetermined minimum value, it is judged that motion has taken place in that macro block and it is an active region. For each frame, in determining whether to track a hand, a check is made to determine if a detected active region satisfies the conditions (a) that the active region made one linear movement in a first direction and (b) the active region returned to the start position where it used to be. That region is locked onto if conditions (a) and (b) are both satisfied. Naturally, any sort of repetitive movement could be used to cue the motion detector to lock onto the hand motion. If two video cameras are used, this process is run in parallel for the outputs of both cameras.

In order that the same general length of hand movement will control the visual indicator to move a consistent corresponding length of movement, the remote controlling method according to the invention further includes a step of automatically adjusting the sensitivity of the visual indicator by the steps of automatically scaling the extremes of the movement of the visual indicator to the extremes of the predetermined hand motion so that, for example, the same diagonal motion of the user's hand will cause the visual indicator to move just across the diagonal of the display screen regardless of whether the user is close to the motion detector circuit or far away.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENT

One embodiment of the system according to the invention operates on the premise that a user does a special hand motion so that, for example, a TV can easily detect and lock onto an image of the user's hand. Another embodiment contemplates that the remote controller of the system will visually recognize the user's hand and lock onto it. In both embodiments, once the hand image is locked, the TV electronically follows the hand's motion and moves a cursor on the TV screen toward the same direction as the hand moves. The user can move the cursor by moving the hand like a PC mouse. Moving the cursor, the user can choose a menu button from a plurality of button icons on the TV display. If the TV loses track of the hand motion after locking, the TV indicates a message to the user and lets the user either do a special hand motion or reselect an on screen image of the user's hand to re-lock and trace the motion.

Figure 1:
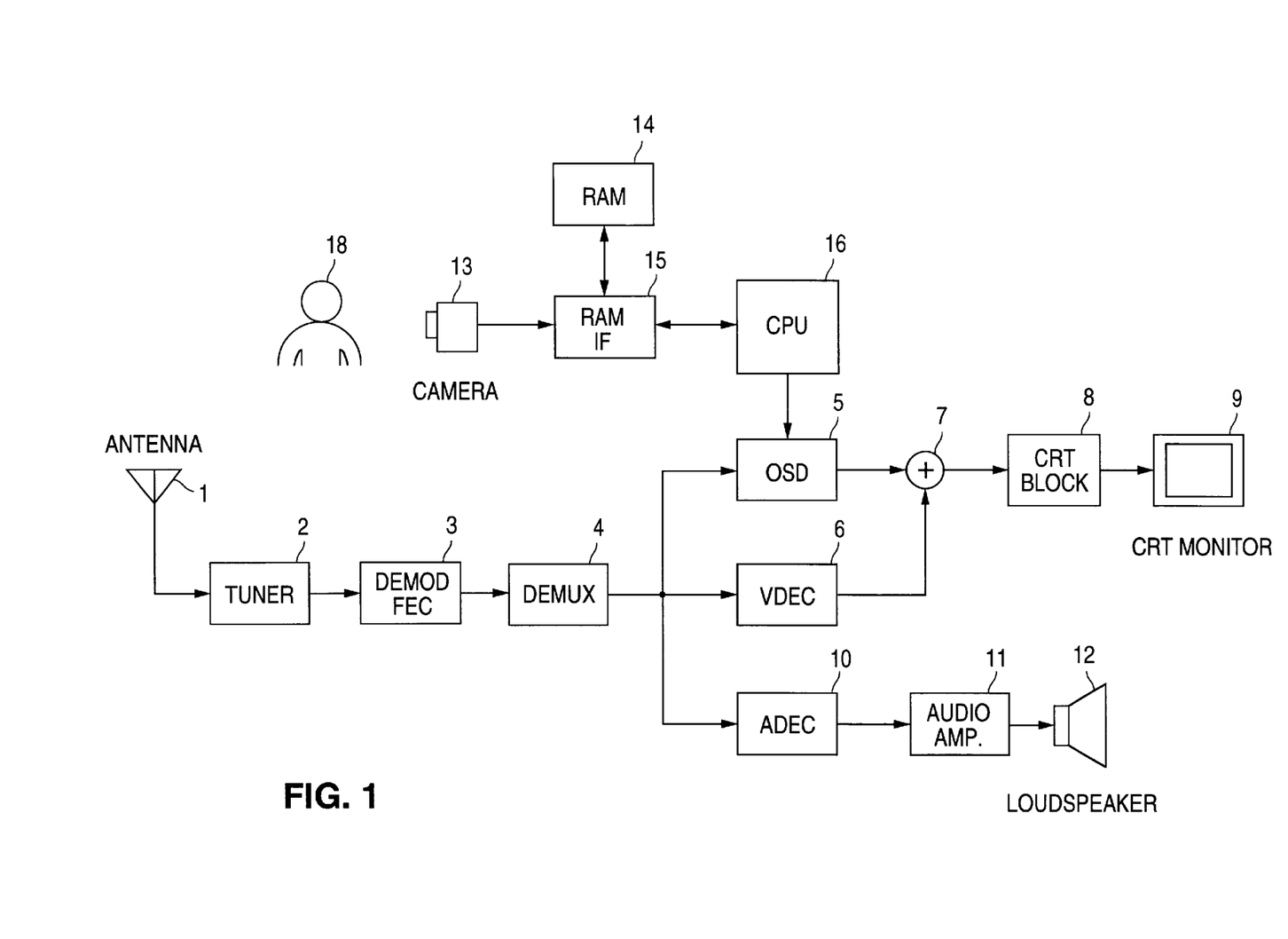
FIG. 1 is a block diagram of the motion sensing remote control system according to the invention.

Referring now to FIG. 1, a block diagram of the system is shown. The portion from blocks 1 to 12 is the same as a common digital TV set. The signal received by an antenna 1 is tuned in a tuner 2, demodulated and error-corrected in a demodulation and error correction block 3, and de-multiplexed in demultiplexer 4. Demultiplexed on screen display (OSD) data, video data and audio data are sent to OSD circuit 5, video decoder 6, and audio decoder 10, respectively. OSD data and the decoded video signal are mixed in a superimposer 7 and sent to a cathode ray tube (CRT) circuit 8 and displayed on CRT monitor 9. Decoded audio data is amplified in an amplifier 11 and sent to a loudspeaker 12.

Blocks 13 to 16 are the main portion of this invention. A camera 13, which can be mounted on the monitor 9, for example, captures video images of a user 18 in front of the TV set and sends its video images to a random access memory (RAM) interface circuit 15 connected to a RAM 14 and a CPU 16. As will be explained in greater detail further in this application, the CPU 16 compares the pixel content of each macro block (having 16×16 pixels) of a current video frame with the pixel content of a corresponding macro block of a previous video frame stored in a RAM 14 and determines by the comparison if motion is taking place within the field of view of the camera 13.

Figure 2:
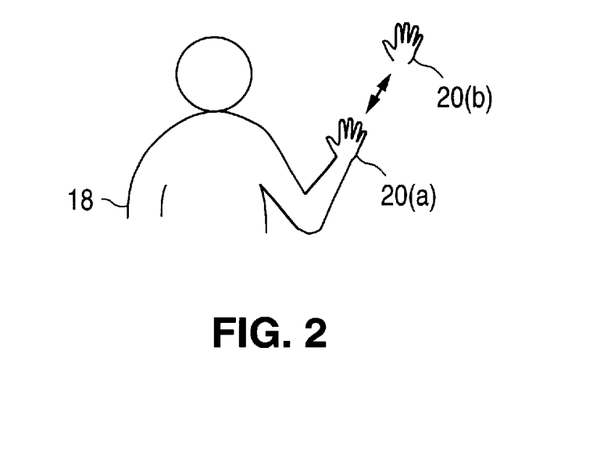
FIG. 2 is a diagrammatic illustration for use in explaining how the user uses a hand motion to cause the remote control system of FIG. 1 to recognize that a motion control signal is about to be made.
Figure 9:
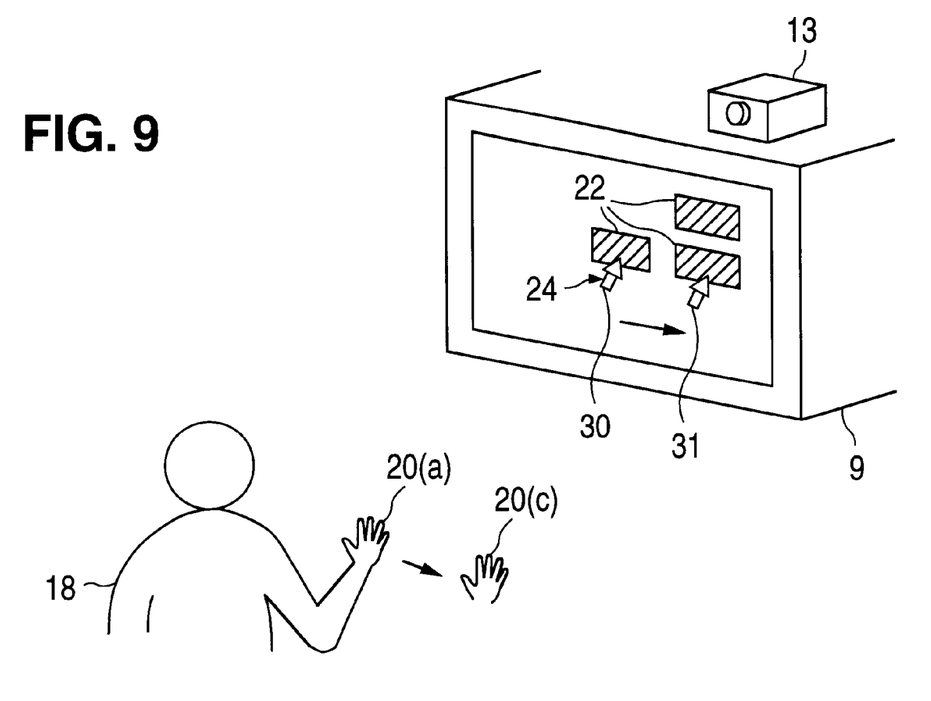
FIG. 9 is a diagrammatic illustration for use in explaining how the user causes the remote control system of FIG. 1 to move an on-screen cursor to follow the hand motion of the user and select a displayed icon.

In a first embodiment, when the user 18 wants to control the TV, the user 18 moves his or her hand 20 in a repetitive and distinctive way, e.g., a back and forth motion between positions 20(a) and 20(b), as shown in FIG. 2. The TV distinguishes this unusual hand motion from other motions and senses that the user 18 wants to communicate. At that time, the TV displays the menu button icons 22 on the CRT display (see FIG. 9)). Once the CPU 16 captures the hand image, the CPU 16 locks the hand motion and an on screen cursor 24 follows it. If the user 18 moves his or her hand 20 to the right, the cursor 24 on the CRT display moves right. The hand 20 and the cursor 24 behave like a PC mouse and a cursor, respectively. Note that the TV does not care about the absolute position of the hand 20. The TV senses only the moving speed and direction of the hand 20 and correspondingly moves the on screen cursor 24. When the cursor 24 comes to a menu button icon 22 the user 18 wants, the user 18 stops and holds his or her hand 20 there a couple of seconds. The CPU 16 of the TV recognizes this action as the equivalent of a "button push" and executes the function the button icon 22 indicates. If no movement is detected for a certain time, it is timed out. The menu disappears. The CPU 16 begins trying to detect another predetermined movement again.

Figure 3:
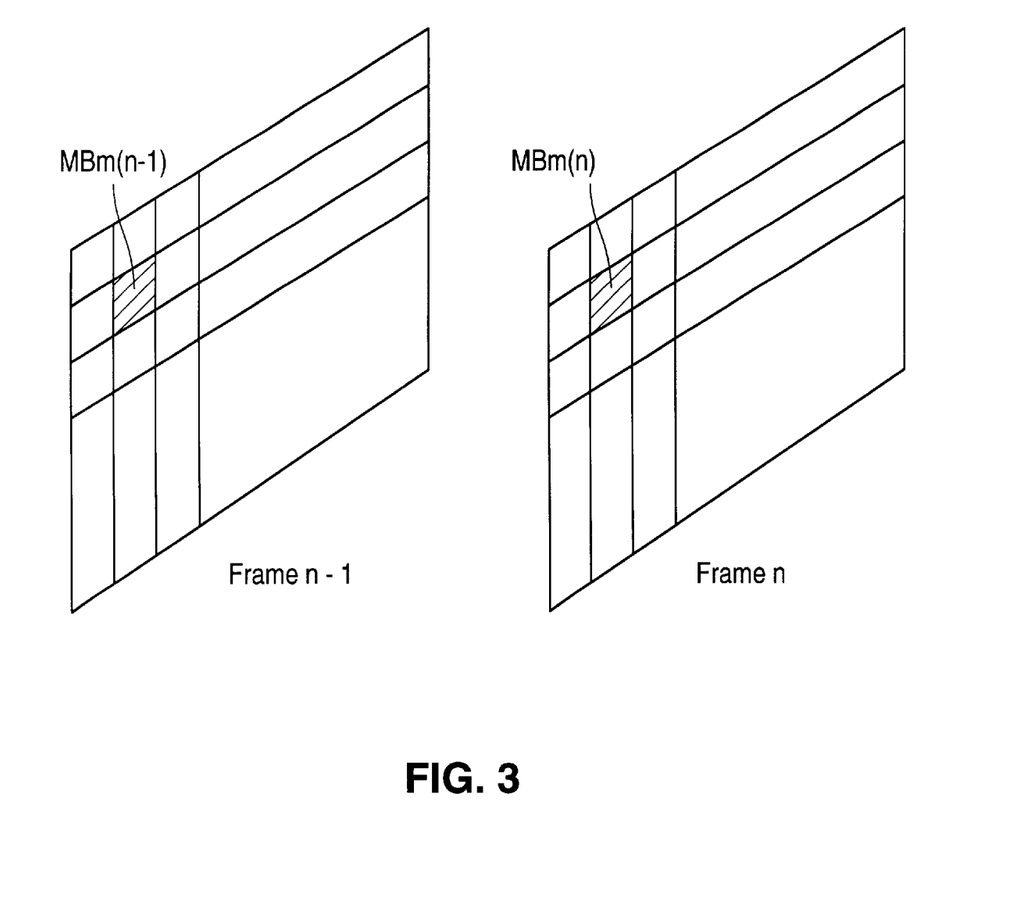
FIG. 3 shows two time sequential frames and macroblocks in each frame for use in explaining how motion is sensed in the embodiment depicted in FIG. 1.

In this first embodiment, the CPU 16 recognizes and locks the hand image as follows. One video frame has, for example, H352×V288 pixels, that is 352 pixels in the horizontal direction and 288 pixels in the vertical direction. One macro block is 16×16 pixels. Therefore, one frame consists of H22×V18 macro blocks. FIG. 3 shows two adjacent frames, frames n−1 and n. MBm(n) indicates the m-th macro block in frame n. MBm(n)[i, j] indicates the pixel at row i and column j in MBm(n). The next formula gives the difference between MBm(n−1)[i, j] and MBm(n)[i, j] in two time successive video frames. This difference is calculated for each macroblock. The function ABS(x) gives a absolute value of x.

$$\text{Difference} = \sum_{j=0}^{j=15} \sum_{i=0}^{i=15} \text{ABS}(MBm(n)[i, j] - MBm(n-1)[i, j]).$$

When the difference is below a certain threshold, it is judged that there was no motion in macro block MBm between frames n−1 and n. It is called an inactive macro block. If there is a still background, for example, a bookshelf or a sofa, the difference is zero or close to zero. When the difference is more than the threshold, some motion is detected in MBm. That macro block is active, as indicated by the shading in the figure. The difference between each corresponding macro block in the two successive frames is calculated. The CPU 16 groups active neighbor macro blocks into one active region and stores it in CPU internal memory or another area of RAM 14. This calculation is much simpler than the motion vector estimation described in the parent application. Software can handle that. No hardware is necessary.

Figure 4:
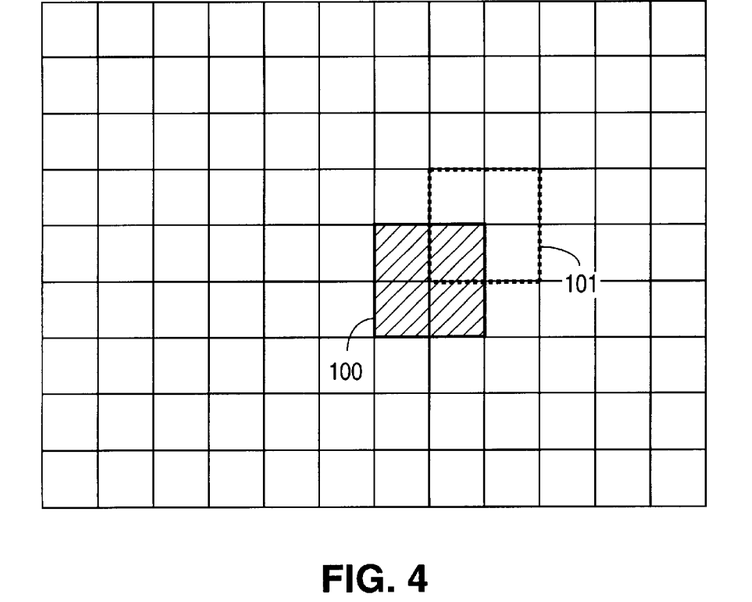
FIGS. 4 and 5 are diagrams of macro blocks in a video signal frame in which an active region of motion (shaded section) is calculated by the remote control system of FIG. 1.

To activate the menu, user 18 has to do the predetermined motion. For example, as shown in FIG. 2, the user moves the hand 20 diagonally twice between 20(a) and 20(b). FIGS. 3 and 4 indicate all the macro blocks in a frame. To make the figure simpler, the number of the macro block drawn in the figure is fewer than the actual number. A shaded macro block is active. Now the user 18 starts moving the hand 20 at 20(a). The associated macro blocks in region 100 become active. As the hand 20 moves toward 20(b), the active region moves to the upper right (region 101). When the user returns the hand 20 from 20(b) to 20(a), the active region also comes back to the start position. When the user repeats the same motion, the active area also moves in the same way again. If an active region meets these conditions, the CPU 16 judges it is the hand image. In this way, CPU 16 can detect the hand position. Even if another moving hand exists in the camera view, CPU 16 is able to distinguish the hand motion from the others because the associated active region moves in the same way as the predetermined hand motion.

Figure 6:
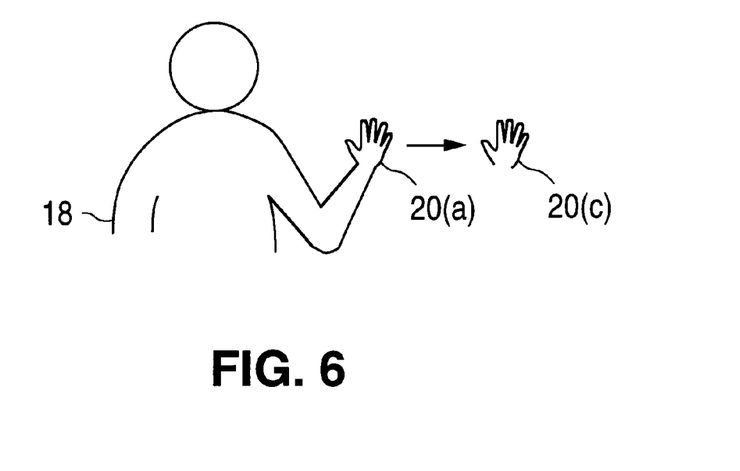
FIG. 6 is an illustration of the user's hand motion in manipulating an on screen cursor.
Figure 7:
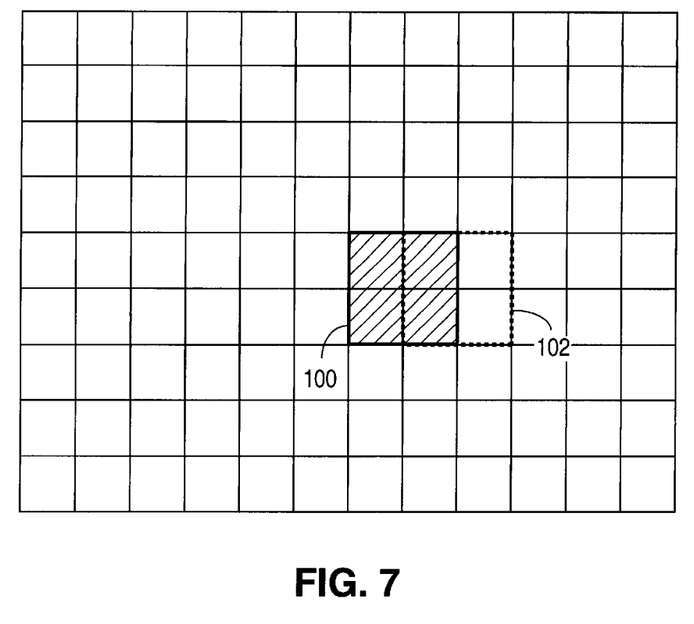
FIGS. 7 and 8 are diagrams of macroblocks illustrating detection of motion of the user's hand in moving an on screen cursor.
Figure 8:
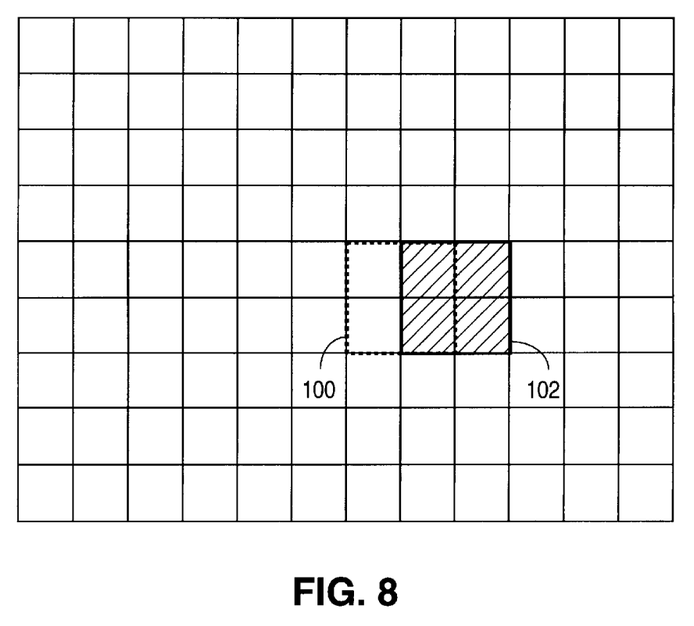

Once the hand position is located, CPU 16 sends a command to OSD 5 and OSD 5 generates menu buttons. (FIG. 9) CPU 16 follows the hand motion. In FIGS. 6–8, the user 18 moves his or her hand 20 horizontally from 20(a) to 20(c). At the same time, the detected active region moves from region 100 to region 102 as shown FIGS. 7 and 8. CPU 16 detects that the hand 20 moved right and lets OSD 5 move the cursor 24 horizontally from position 30 to position 31 on CRT 9. In this way, the cursor 24 moves toward the direction of hand motion. In order to select a menu button 22, the user holds the cursor 24 on the button for a while. CPU 16 recognizes that the user 18 selects that button 22 and executes the associated task.

If the CPU 16 loses track of the hand 20, the CPU 16 informs the OSD 5 to cause the CRT 9 to display the message "Move your hand right". The user 18 follows the message. Then the CPU 16 causes the OSD 5 to control the CRT 9 to display another message "Move your hand upward." The user 18 follows the message again. If the CPU 16 captures the image that moves right first and upward next, then the CPU 16 re-captures and locks on the hand image again.

Figure 16:
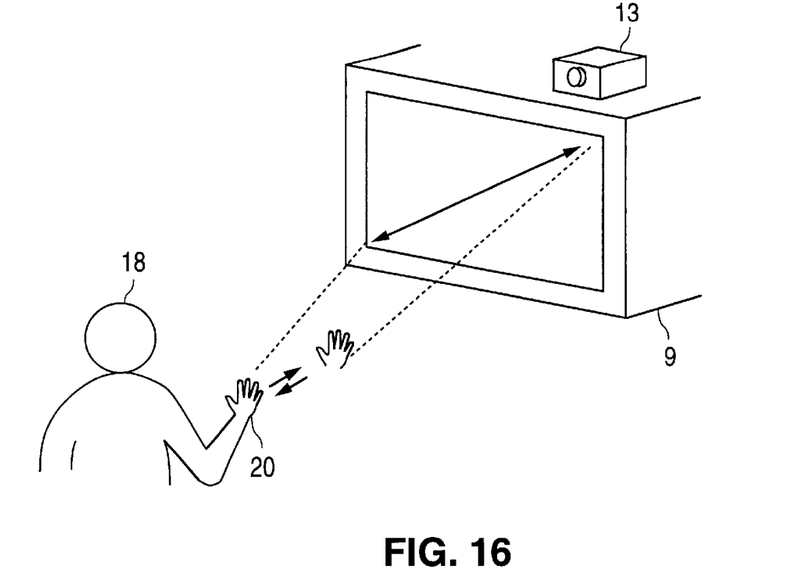
FIG. 16 is an illustration showing how the user cooperates in setting the automatic cursor sensitivity adjustment control.

The special hand motion is not limited to a linear move. Any other special gesture will do. To let the TV know the menu button icon 22 is chosen, the user can do another special gesture instead of holding the hand 20 still. For example, as a variation of the circular hand motion, the user 18 may move the hand 20 several times (for example twice) toward a diagonal direction, for example, lower left to upper right, as shown in FIG. 16.

Figure 10:
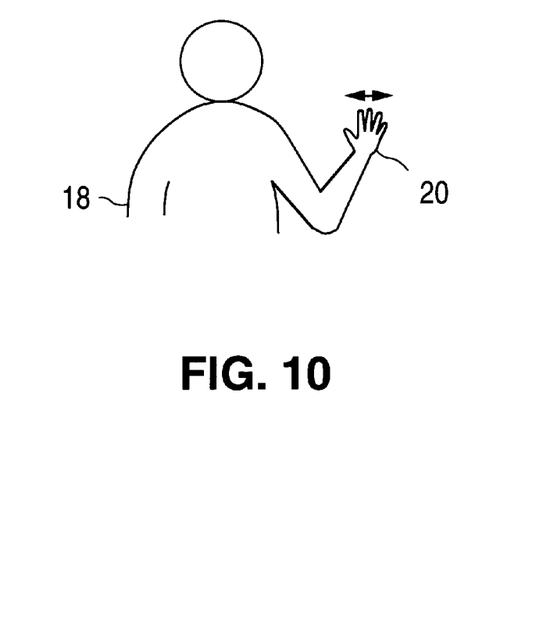
FIGS. 10, 11(a) and 11(b) are diagrammatic illustrations for use in explaining how the user uses other types of predetermined hand motions to cause the remote control system of FIG. 1 to recognize the user's hand.
Figure 11A:
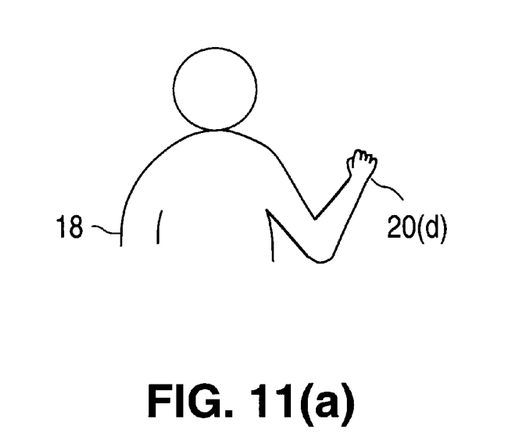
Figure 11B:
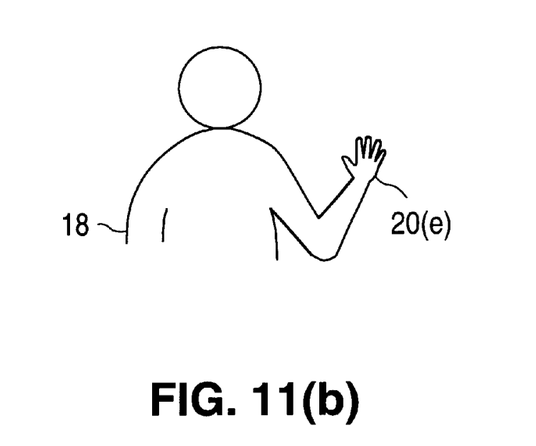

Alternatively, hand pattern recognition technique can be employed to locate the hand position. This is a more sophisticated solution. In this case, the predetermined hand motion is smaller. The user 18 shakes an open hand 20 a little as shown in FIG. 10 or first clasps the hand 20(d) and then opens it 20(e), as seen in FIGS. 11(a) and 11(b), respectively. These small motions cause the associated macro blocks to be considered active by the CPU 16 and let CPU 16 know the hand location. Once the hand 20 is located, in order to prevent misdetection, the CPU 16 digitally "cuts out" the hand image and judges whether it is the hand image or not.

Figure 12:
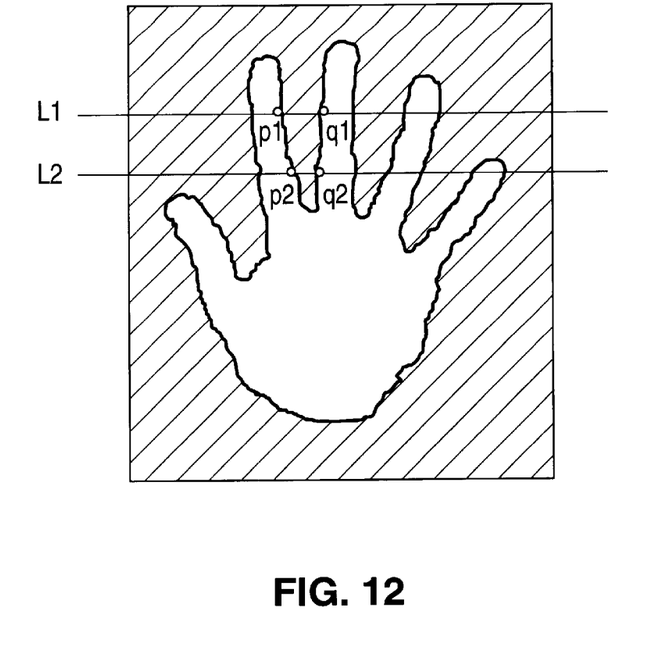
FIGS. 12–15 are diagrams for use in explaining how the remote control system can recognize an image of the user's hand.

CPU 16 converts the cut-out image to a binary-level image shown in FIG. 12. The most significant features of an open hand image are the V-shapes between the fingers. CPU 16 checks all the edges on the same horizontal line in the binary-level image. See points p1 and q1 on horizontal scan line L1 in FIG. 12. At the next lower horizontal scan line, these two edge points get closer together (p2 and q2 on line L2) and finally they meet together. By calculating the distance between each edge point on the same horizontal scan line, CPU 16 can know whether the profile of the image has a V-shape or not. When one or more V-shapes are detected, CPU 16 makes a decision that it is a hand image. Once the hand 20 is detected, the CPU 16 follows the hand 20 as described above. This hand pattern recognition requires so small an amount of calculations that software can handle it.

Figure 13:
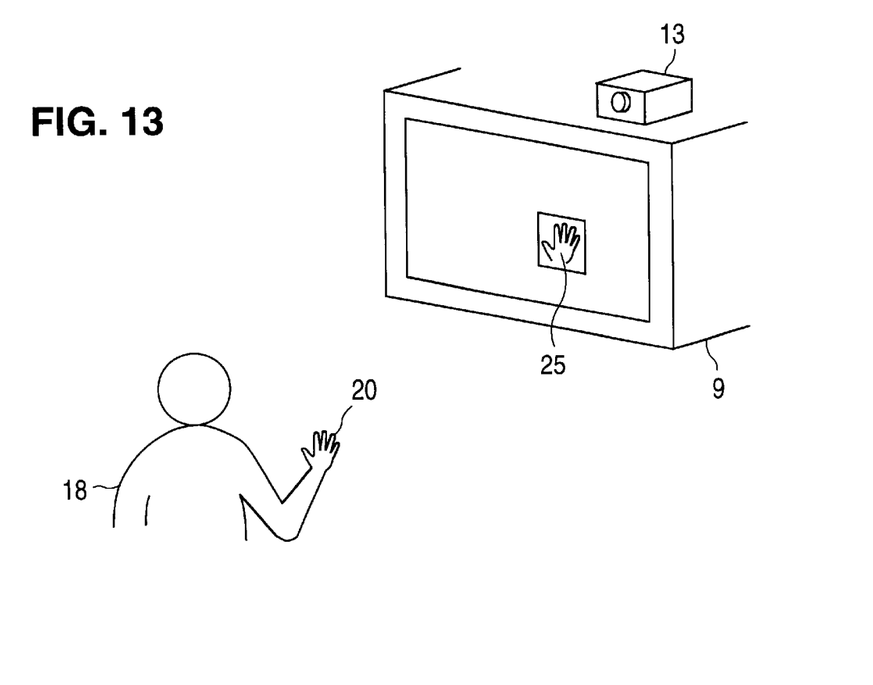
Figure 14:
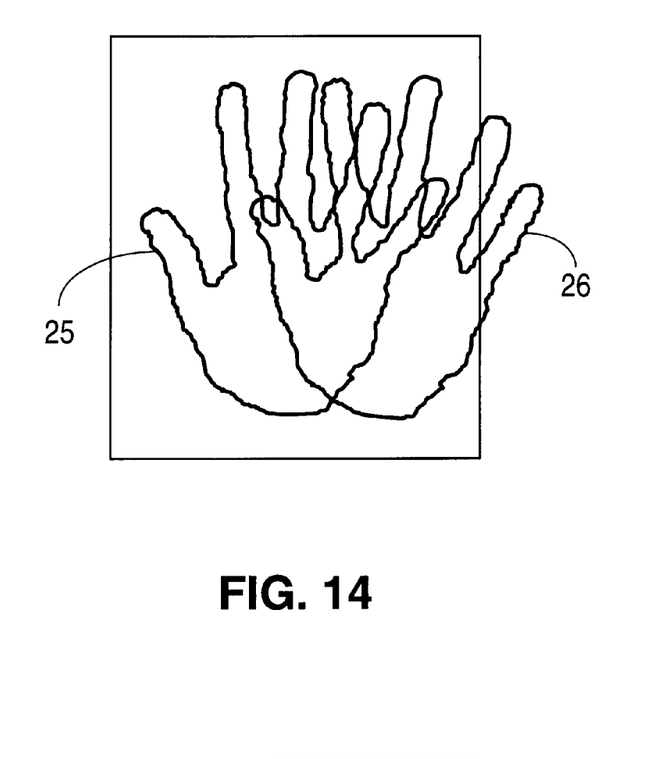
Figure 15:
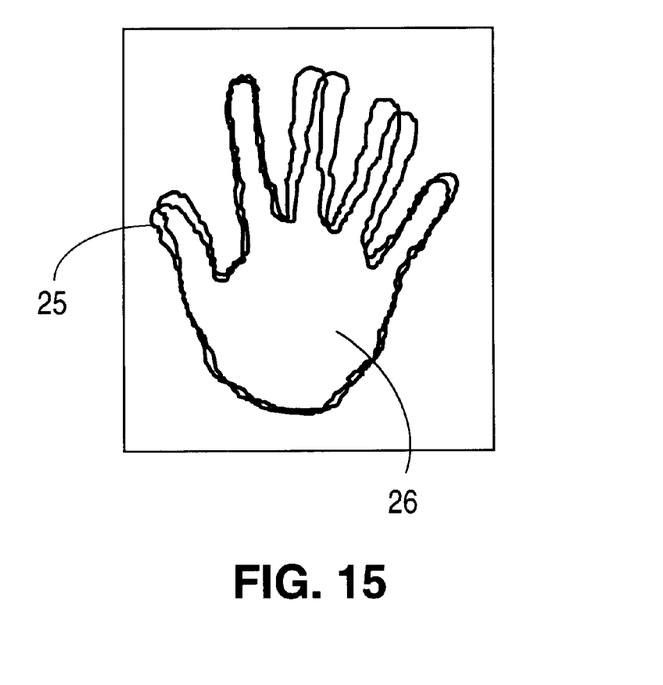

Instead of this hand pattern recognition, a hand image matching technique may be used. Referring now to FIG. 13, first, using a conventional infrared (IR) remote commander, the user 18 causes the OSD 5 to display the image taken by the camera 13 on the CRT 9, e.g., takes a video snapshot of him/herself and using conventional graphical user interface techniques selects out an image 25 of the hand 20. The image 25 is stored in RAM 14. If necessary, two or more hand images may be stored, e.g., one for a small child or another for a left-handed person. Thereafter, when the hand 20 is located, CPU 16 compares the image in the located region with the stored hand pattern and finds the position where both of them match best. In FIG. 14, the actual image 26 and the stored hand image 25 are compared and the best matching position is detected in FIG. 15. The two images do not always perfectly match, of course. The difference between video images 25 and 26 is calculated in the same way as the macro block difference described above. If the difference is below a certain threshold, CPU 16 judges that the image 26 is the hand image and follows it. (In order to make the figures easier to see, the actual hand profiles are shown in FIGS. 25 and 26, but in actual practice, binary-level images of the type shown in FIG. 12 are used.

While various schemes have been described above for locking onto the hand 20 of the user 18, the most important point of this invention is that either a user does a special predetermined move so that the CPU 16 can easily distinguish it from other visually "noisy" moves, or the CPU 16 actually detects an image of the hand as distinct from other objects in the field of view of the camera 13.

Figure 17:
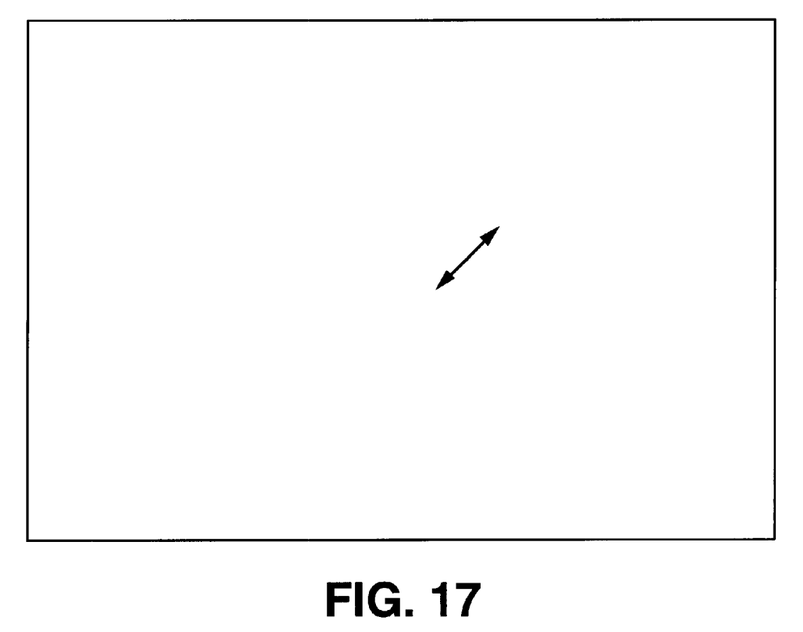
FIGS. 17 and 18 depict the user's diagonal hand motion as detected by the remote control system of FIG. 1 when the user is close to the TV (FIG. 17) and when the user is far from the TV (FIG. 18).
Figure 18:
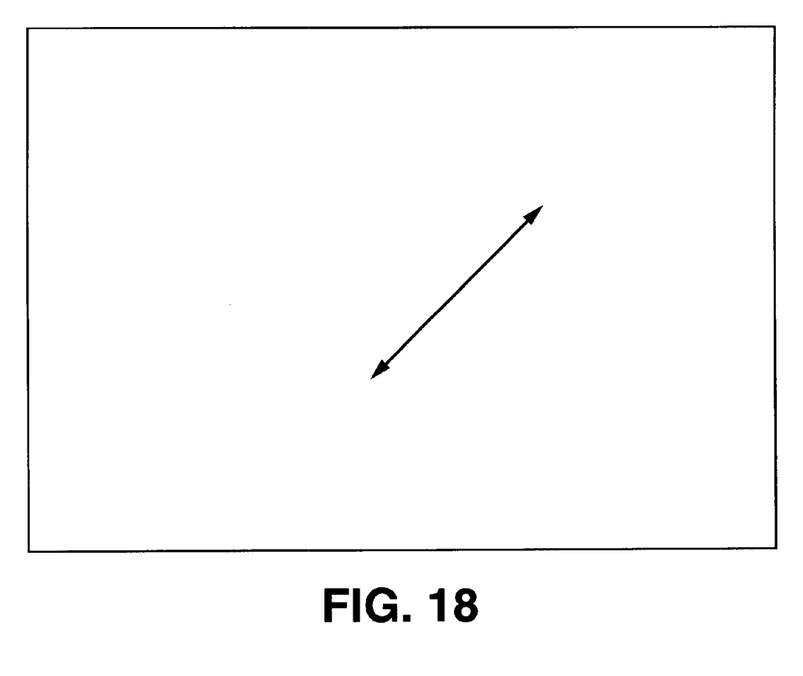

The moving distance of the hand 20 depends on the camera view angle and the distance between the camera 13 and the user 18. FIGS. 16–18 show a diagonal hand motion in the camera view. If the view angle is wide or the user 18 is at some distance from the camera 13, the corresponding distance moved by the cursor 24 on the display is relatively shorter than it would be if the view angle was not so wide or the user 18 was closer to the camera 13. (FIG. 17). If the view angle is narrow or the user 18 is too close to the camera 13, the hand motion distance is large. (FIG. 18). Assume that the cursor 24 sensitivity is fixed. In the former case, the cursor 24 moves little even if the user 18 makes a large motion of his or her hand 20. In the latter case, the cursor 24 is too sensitive and it moves a relatively large distance in response to a small hand motion.

To solve this problem, this system has an auto cursor sensitivity adjustment function. When the predetermined motion is small in the camera view, the CPU 16 moves the cursor 24 largely. When the predetermined motion is large in the camera view, the CPU 16 moves the cursor 24 a little. For example, in FIG. 17, assume that the predetermined hand motion is 50 pixels long. In this case, the CPU 16 makes the cursor 24 move 4 pixels when the hand 20 moves 1 pixel, i.e. the cursor motion is automatically scaled to the length of the detected hand motion. In FIG. 18, the predetermined hand motion is 200 pixels long. The cursor 24 should move 1 pixel for every one pixel of hand motion. If the user 18 wants to move the cursor 24 from the left side to the right side of the display, the user only should move the hand 20 almost the same distance regardless of the camera view angle or the user's position from the camera 13. This auto cursor sensitivity is implemented in the software of the CPU 16.

Referring now to FIG. 16, when the user 18 makes a predetermined motion in the form of a diagonal hand movement, the CPU 16 locks onto the hand movement and moves the cursor 24 diagonally across the face of the TV screen. CPU 16 always calculates the ratio of the video frame diagonal distance to the distance of the hand stroke. The cursor is controlled proportionally to the ratio. If the user 18 controls the length of his or her hand movement to be constant, the CPU 16 is programmed to recognize this as the largest hand motion that needs to be detected and scales the corresponding movement of the cursor 24 so that it just spans the entire diagonal of the TV screen. This scale between the length of hand movement and the length of corresponding cursor movement is thereafter maintained for other hand movements. If the recognized diagonal hand stroke was ten inches, after the hand image is locked, the user 18 has to move the hand 20 ten inches diagonally in order to move the cursor from the lower left corner to the upper right corner on the CRT monitor 9. If the recognized diagonal hand stroke is 20 inches, the user has to move the hand 20 inches to move the cursor in the same way.

Instead of a cursor 24, a button may be highlighted like a digital satellite system graphical user interface (DSS GUI). When the hand 20 moves up, the upper button icon gets highlighted and so on. To choose the highlighted button, the user 18 holds the hand 20 on the button for some seconds. As used in this specification and claims, the term "cursor" is to be deemed to include any change in the TV display which tracks the movement of the user's detected motion, including such highlighting of button icons in correspondence to the motion of the user's hand.

Figure 19:
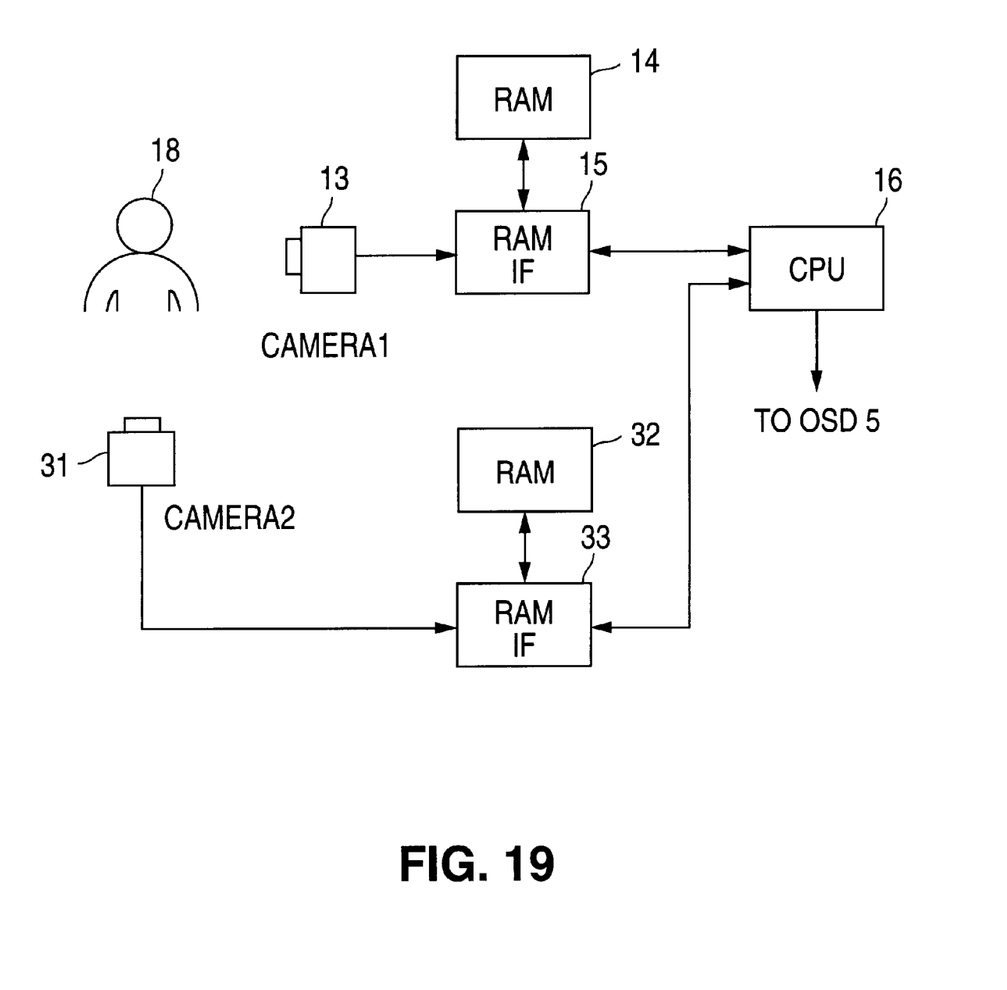
FIG. 19 is a block diagram of another embodiment of the invention which detects motion in three dimensions.
Figure 20:
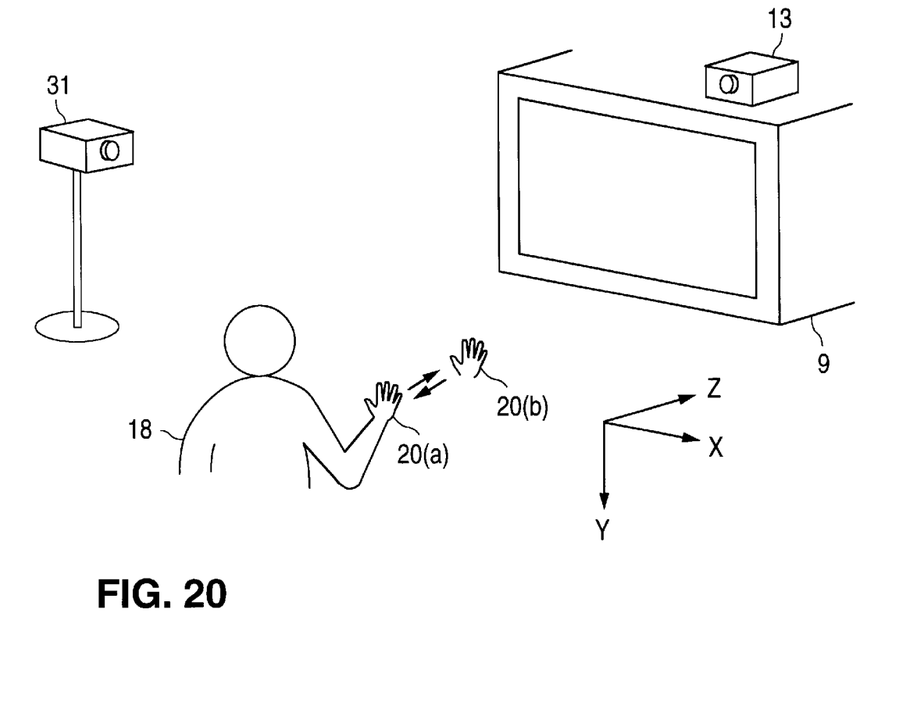
FIG. 20 is an illustration of the embodiment of depicted in FIG. 19 as it would be implemented.

The invented system can be extended to a 3-D hand motion interface. Referring now to FIGS. 19 and 20, a second camera 31 is set at the left or right side of the user 18. Alternatively, it may be set on the ceiling. The second camera 31 senses the hand motion toward the TV set (Z-axis). FIG. 19 is a block diagram of the system. Blocks 1 to 16 are identical to FIG. 1 and so have been eliminated from the figure for convenience of explanation. It is to be understood, however, that these elements are present in this embodiment, even though not shown. Camera 31, RAM 32, and RAM interface 33 correspond in function to elements 13, 14 and 15, respectively, but are used for detecting motions on the Z-axis. They work in the same way as the camera 13, the RAM 14, and RAM interface 15.

Figure 5:
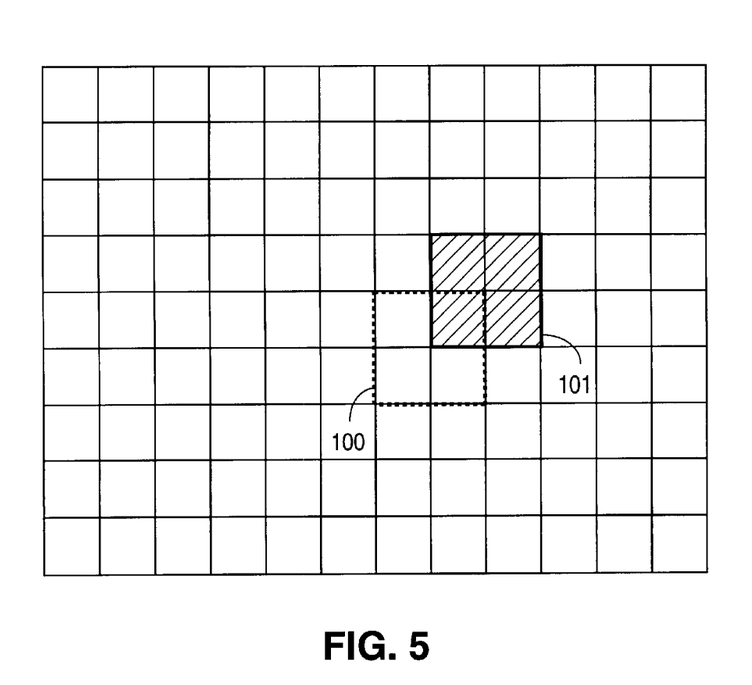
Figure 21:
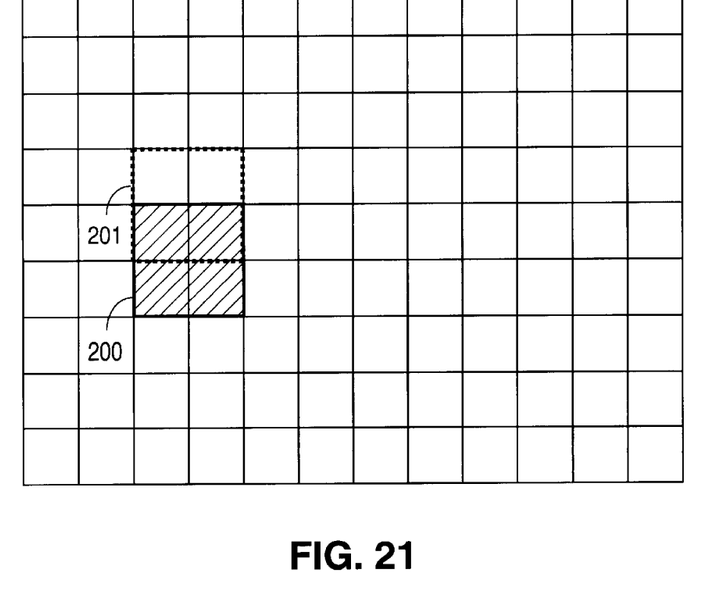
FIGS. 21 and 22 are diagrams of macro blocks in a video signal frame in which active regions of motion are calculated by the remote control system of FIG. 19 and further depicts active regions as shaded.
Figure 22:
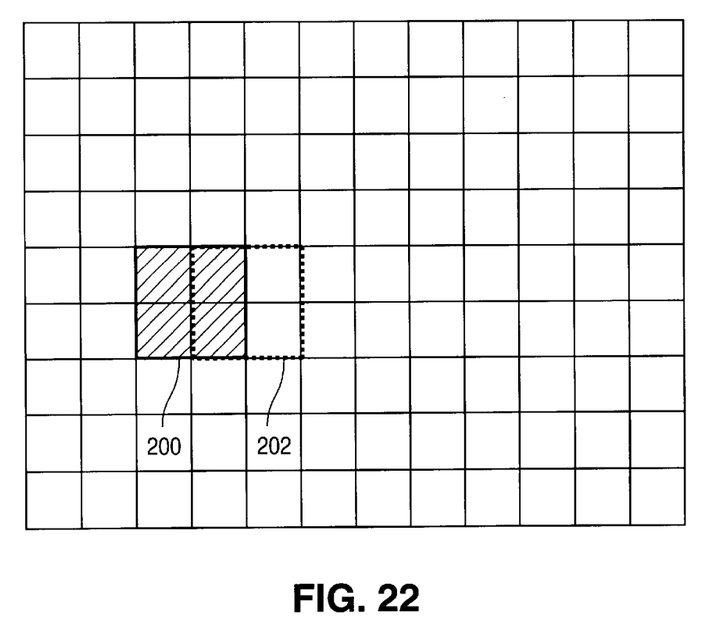

First, the user 18 does the predetermined hand motion, for example, a diagonal motion. As mentioned above, by checking the active region, the hand 20 is located in the X-Y plane. Also, CPU 16 monitors the video signal from camera 31 and locates the hand position in the Y-Z plane. As the user 18 moves the hand 20 between positions 20(a) and 20(b) in FIG. 20, the active region moves as shown in FIGS. 4 and 5. At the same time, however, the active region in the Y-Z plane moves from the position 200 to the position 201 as shown in FIG. 21. Because both of these active regions move at the same time, CPU 16 easily locates the hand position in the X-Y plane and the Y-Z plane. Moreover, in the case that the hand 20 moves toward the CRT 9, the active region moves from the position 200 to the positio 202 in FIG. 22. In this way, CPU 16 can also obtain the hand motion on the Z-axis.

There are several applications for the invented 3-D interface. It can be applied for a 2-D OSD. A motion on the Z-axis may be used to choose a menu button. When the user 18 wants to select a menu button, he or she stops the cursor 24 on the button 22. Then, the user 18 moves his or her hand 20 close to the CRT 9 and back again to the original position in a manner similar to pushing a mechanical button. This Z-axis motion is detected by CPU 16 as a selection of that button icon and the CPU 16 executes the task associated with the button icon.

Z-axis motion may also be used for zooming. As the hand 20 gets closer to CRT 9, CPU 16 sends a command to OSD 5 or video decoder 6 and makes them zoom in the image on the CRT 9. When the hand 20 goes away from CRT 9, the image is zoomed out. This technique gives the user 18 a very natural feeling of zooming. Before zooming, the user 18 may use the cursor 24 to select the image area to zoom or may select the center of zooming by moving the cursor 24 with hand motion.

The user 18 can control the cursor 24 in 3-D graphics. This is a good interface for computer games. When the hand 20 gets closer to CRT 9, the cursor gets smaller and appears further away in the 3-D graphics. The user 18 can select an object placed behind another object. For example, the user 18 can obtain the feeling of browsing and picking up a document from a file folder. This system gives the user 18 almost the same feeling as handling a thing in the real world.

This invention can be applied for not only digital TV, but also analog TV, PC video-phone, or any system that uses a camera and monitor display. Not only a CRT but also other kinds of displays (for example, an LCD, projection TV, etc.) can be used.

As an extended feature, if the camera is motor-driven, the CPU 16 can control the pan, tilt, or zoom of the camera automatically so that the hand image is positioned at the best place (usually the center) in the camera view.

This system does not require color signals. Therefore, for a dark place, an infrared camera 13 may be used.

If the CPU 16 connects with a network interface, for example a 1394 interface, this system can send hand position data and control another device through the network. This system does not have to be built into a TV set.

Although the present invention has been shown and described with respect to preferred embodiments, various changes and modifications are deemed to lie within the spirit and scope of the invention as claimed. The corresponding structures, materials, acts, and equivalents of all means or step plus function elements in the claims which follow are intended to include any structure, material, or acts for performing the functions in combination with other claimed elements as specifically claimed.

What is claimed is:

1. A remote controller for an electronic appliance, comprising:
    a display screen for displaying icons representing possible operations of the electronic appliance;
    a motion detector for detecting a hand motion within a field of view of the motion detector, the motion detector first detecting a predetermined motion of a user's hand within the field of view to initiate remote control operation and, thereafter, tracking the movement of the hand and outputting a cursor control signal representative of the motion of the hand; and
    a control circuit, connected to the display screen, the electronic appliance, and the motion detector and supplied with the cursor control signal, for controlling the display screen to display a movable visual indicator which tracks the movement of the moving hand and for controlling the electronic appliance to perform operations corresponding to the icons selected by the user using the visual indicator.

2. A remote controller according to claim 1, wherein the motion detector detects the selection of an icon by the user by detecting a predetermined motion pattern of the hand when the visual indicator is coincident on the display screen with a particular icon.

3. A remote controller according to claim 2, wherein the predetermined motion pattern is a cessation of movement of the hand for a predetermined period of time after the visual indicator is coincident on the display screen with the particular icon.

4. A remote controller according to claim 2, wherein the predetermined motion pattern is a movement of the hand along an axis perpendicular to the display screen after the visual indicator is coincident on the display screen with the particular icon.

5. A remote controller according to claim 1, wherein the motion detector includes at least one video camera.

6. A remote controller according to claim 5, wherein the motion detector detects motion by comparing the pixel values of each corresponding macro block between two time sequential video frames in a video output signal from the video camera and determining that motion has taken place with respect to a macro block if the difference in pixel values between the two video frames for that macro block exceeds a predetermined threshold value and, if so, determining that macro block to be an active region.

7. A remote controller according to claim 6, wherein in detecting the user's hand, the motion detector checks each macro block of the two time sequential video frames to determine if a grouping of physically proximate macro blocks in a single video frame exhibits a predetermined pattern of becoming active regions and then non-active regions.

8. A remote controller according to claim 7, wherein in detecting the user's hand, the motion detector, after detecting that a grouping of physically proximate macro blocks in a single video frame exhibits a predetermined pattern of becoming active regions and then non-active regions, compares a portion of the video image contained in the current active region with a stored video image and determines that the current active region of the video image output by the camera is the user's hand if there is a match with the stored video image.

9. A remote controller according to claim 5, wherein in detecting the user's hand, the motion detector compares a user selected portion of the video image output by the camera with a stored video image and determines that the user selected portion of the video image output by the camera is the user's hand if there is a match with the stored video image.

10. A remote controller according to claim 1, wherein the visual indicator is a cursor.

11. A remote controller according to claim 1, wherein the electronic appliance is a television set.

12. A remote controller according to claim 1, wherein the display screen is a cathode ray tube.

13. A remote controller according to claim 1, further comprising an automatic cursor sensitivity control means for automatically adjusting a length of movement of the visual indicator on the display screen relative to a corresponding length of movement of the moving hand detected by the motion detector.

14. A remote controller according to claim 13, wherein the automatic cursor sensitivity control means adjusts the length of movement of the visual indicator on the display screen to move a fixed, predetermined distance on the display screen in response to the length of the detected first predetermined motion.

15. A remote controller according to claim 1, wherein the motion detector includes two video cameras placed perpendicularly with respect to each other to view the user.

16. A remote controller according to claim 15, wherein the motion detector detects motion by comparing the pixel values of each macro block between two time sequential video frames in a video output signal from each video camera and determining that motion has taken place with respect to a macro block if the difference in pixel values between the two video frames for that macro block exceed a predetermined threshold value and, if so, determining that macro block to be an active region.

17. A remote controller according to claim 16, wherein in detecting the user's hand, the motion detector checks each macro block of the two time sequential video frames of each camera to determine if a grouping of physically proximate macro blocks in a single video frame exhibits a predetermined pattern of becoming active regions and then non-active regions.

18. A remote controller according to claim 17, wherein in detecting the user's hand, the motion detector, after detecting that a grouping of corresponding physically proximate macro blocks in a single video frame of the output of each camera exhibits a predetermined pattern of becoming active regions and then non-active regions, locks onto the active regions of the video images of both cameras as the active regions.

19. A remote controller according to claim 17, wherein in detecting the user's hand, the motion detector, after detecting that a grouping of corresponding physically proximate macro blocks in a single video frame of the output of each camera exhibits a predetermined pattern of becoming active regions and then non-active regions, compares a portion of the video image contained in the current active region with a stored video image and determines that the current active region of the video image output by the cameras is the user's hand if there is a match with the stored video image.

20. A remote controller according to claim 15, wherein the motion detector detects the selection of an icon by the user by detecting a predetermined motion pattern of the hand when the visual indicator is coincident on the display screen with a particular icon.

21. A remote controller according to claim 20, wherein the predetermined motion pattern is a cessation of movement of the hand for a predetermined period of time after the visual indicator is coincident on the display screen with the particular icon.

22. A remote controller according to claim 20, wherein the predetermined motion pattern is a movement of the hand along an axis perpendicular to the display screen after the visual indicator is coincident on the display screen with the particular icon.

23. A method of remote controlling an electronic appliance, comprising the steps of:
displaying icons on a display screen representing possible operations of the electronic appliance;
detecting a hand motion within a field of view of the motion detector by the steps of first detecting a predetermined motion of a user's hand within the field of view to initiate remote control operation and, thereafter, tracking the movement of the hand and outputting a cursor control signal representative of the motion of the hand; and
controlling the display screen to display a movable visual indicator which tracks the movement of the moving hand and for controlling the electronic appliance to perform operations corresponding to the icons selected by the user using the visual indicator.

24. A method of remote controlling according to claim 23, wherein the motion detecting step includes detecting the selection of an icon by the user by detecting a predetermined motion pattern of the hand when the visual indicator is coincident on the display screen with a particular icon.

25. A method of remote controlling according to claim 23, wherein the predetermined motion pattern is a cessation of movement of the hand for a predetermined period of time after the visual indicator is coincident on the display screen with the particular icon.

26. A method of remote controlling according to claim 23, wherein the predetermined motion pattern is a movement of the hand along an axis perpendicular to the display screen after the visual indicator is coincident on the display screen with the particular icon.

27. A method of remote controlling according to claim 23, wherein the motion detecting step includes the step of using a video camera to generate a video image of the field of view.

28. A method of remote controlling according to claim 27, wherein the motion detecting step includes the steps of detecting motion by comparing the pixel values of each macro block between two time sequential video frames in a video output signal from the video camera and determining that motion has taken place with respect to a macro block if the difference in pixel values between the two video frames for that macro block exceed a predetermined threshold value and, if so, determining that macro block to be an active region.

29. A method of remote controlling according to claim 28, wherein in detecting the user's hand, the motion detecting step includes the steps of checking each macro block of the two time sequential video frames to determine if a grouping of physically proximate macro blocks in a single video frame exhibits a predetermined pattern of becoming active regions and then non-active regions.

30. A remote controller according to claim 28, wherein in detecting the user's hand, the motion detecting step includes the steps, after detecting that a grouping of corresponding physically proximate macro blocks in a single video frame of the output of each camera exhibits a predetermined pattern of becoming active regions and then non-active regions, comparing a portion of the video image contained in the current active region with a stored video image and determining that the current active region of the video image output by the cameras is the user's hand if there is a match with the stored video image.

31. A method of remote controlling according to claim 30, wherein in detecting the user's hand, the motion detecting step includes the steps of, after detecting that a grouping of physically proximate macro blocks in a single video frame exhibits a predetermined pattern of becoming active regions and then non-active regions, comparing a portion of the video image contained in the current active region with a stored video image and determining that the current active region of the video image output by the camera is the user's hand if there is a match with the stored video image.

32. A method of remote controlling according to claim 23, wherein the visual indicator is a cursor.

33. A method of remote controlling according to claim 23, wherein the electronic appliance is a television set.

34. A method of remote controlling according to claim 23, wherein the display screen is a cathode ray tube.

35. A method of remote controlling according to claim 23, further comprising the steps of automatically adjusting a length of movement of the visual indicator on the display screen relative to a corresponding length of movement of the moving hand detected by the motion detecting step.

36. A method of remote controlling according to claim 35, further comprising the steps of adjusting the length of movement of the visual indicator on the display screen to move a fixed, predetermined distance on the display screen in response to the length of the detected first predetermined motion.

37. A method of remote controlling according to claim 23, wherein the motion detecting step includes generating two simultaneous video images of the field of view by using two video cameras placed perpendicularly with respect to each other to view the user.

38. A method of remote controlling according to claim 37, wherein the motion detecting step includes the steps of detecting motion by comparing the pixel values of each macro block between two time sequential video frames in a video output signal from each video camera and determining that motion has taken place with respect to a macro block if the difference in pixel values between the two video frames for that macro block exceed a predetermined threshold value and, if so, determining that macro block to be an active region.

39. A method of remote controlling according to claim 32, wherein in detecting the user's hand, the motion detecting step includes the steps of checking each macro block of the two time sequential video frames of each camera to determine if a grouping of physically proximate macro blocks in a single video frame exhibits a predetermined pattern of becoming active regions and then non-active regions.

40. A method of remote controlling according to claim 39, wherein in detecting the user's hand, the motion detecting step includes the steps of, after detecting that a grouping of corresponding physically proximate macro blocks in a single video frame of the output of each camera exhibits a predetermined pattern of becoming active regions and then non-active regions, comparing a portion of the video image contained in the current active region with a stored video image and determining that the current active region of the video image output by the cameras is the user's hand if there is a match with the stored video image.

41. A method of remote controlling according to claim 37, wherein in detecting the user's hand, the motion detecting step includes the steps of comparing a user selected portion of the video image output by the cameras with a stored video image and determining that the user selected portion of the video image output by the cameras is the user's hand if there is a match with the stored video image.

42. A method of remote controlling according to claim 37, wherein the motion detecting step includes the steps of detecting the selection of an icon by the user by detecting a predetermined motion pattern of the hand when the visual indicator is coincident on the display screen with a particular icon.

43. A method of remote controlling according to claim 42, wherein the predetermined motion pattern is a cessation of movement of the hand for a predetermined period of time after the visual indicator is coincident on the display screen with the particular icon.

44. A method of remote controlling according to claim 42, wherein the predetermined motion pattern is a movement of the hand along an axis perpendicular to the display screen after the visual indicator is coincident on the display screen with the particular icon.

\* \* \* \* \*